United States Patent [19]

Hall et al.

[11] Patent Number: 5,067,789
[45] Date of Patent: Nov. 26, 1991

[54] FIBER OPTIC COUPLING FILTER AND AMPLIFIER

[75] Inventors: Douglas W. Hall, Corning; Robert M. Hawk, Bath, both of N.Y.

[73] Assignee: Corning Incorporated, Corning, N.Y.

[21] Appl. No.: 655,726

[22] Filed: Feb. 14, 1991

[51] Int. Cl.$^5$ ............................ G02B 6/26; G02B 6/42
[52] U.S. Cl. ........................................ 385/27; 385/126; 385/15; 359/341
[58] Field of Search ............... 350/96.15, 96.29, 96.30, 350/96.33, 96.34; 372/6

[56] References Cited

U.S. PATENT DOCUMENTS

| | | | |
|---|---|---|---|
| 4,478,489 | 10/1984 | Blankenship | 350/96.30 |
| 4,938,556 | 7/1990 | Diggonet | 350/96.15 |
| 4,941,726 | 7/1990 | Russell | 350/96.15 |
| 4,955,025 | 9/1990 | Mears | 372/6 |
| 4,959,837 | 9/1990 | Ferrier | 372/6 |

Primary Examiner—William L. Sikes
Assistant Examiner—Robert E. Wise
Attorney, Agent, or Firm—William J. Simmons, Jr.

[57] ABSTRACT

The disclosed fiber optic filter structure includes an optical fiber having a single-mode core surrounded by cladding material, and at least one light-attenuating light path in the cladding material uniformly spaced from the single-mode core. The propagation constants of the single-mode core and the light path are different at wavelengths except for at least one wavelength $\lambda_4$. The spacing between the single-mode core and the light path are sufficiently small that light within a first band of wavelengths centered around $\lambda_f$ couples between the single-mode core and the light path. At least a portion of the light within the first band of wavelengths is absorbed in the light path. In that embodiment in which the single-mode core is a fiber amplifier gain core, the filtering function of the light path modifies the fiber amplifier gain spectrum.

30 Claims, 2 Drawing Sheets

FIBER OPTIC COUPLING FILTER AND AMPLIFIER

BACKGROUND OF THE INVENTION

The present invention relates to fiber amplifiers having filter means for attenuating or removing unwanted wavelengths and to fiber optic filters for use in such amplifiers.

Doped optical fiber amplifiers consist of an optical fiber the core of which contains a dopant such as rare earth ions. Such an amplifier receives an optical signal of wavelength $\lambda_s$ and a pump signal of wavelength $\lambda_p$ which are combined by means such as one or more couplers located at one or both ends of the amplifier. The spectral gain of a fiber amplifier is not uniform through the entire emission band. For example, an erbium doped fiber, the gain band of which coincides with the 1550 nm telecommunications window of silica fiber, has a gain spectrum that is typically irregular, with a narrow peak around 1536 nm and a broad band with reduced gain at longer wavelengths.

The ability to modify the gain spectrum of a fiber amplifier is useful. Two modifications are of interest: (1) gain flattening and (2) gain narrowing. Gain flattening is of interest for such applications as wavelength division multiplexing. Gain narrowing is of interest because although the amplifier can be operated at wavelengths away from the peak gain without gain narrowing, disadvantages occur due to increased spontaneous-spontaneous beat noise and possible laser action at the peak gain wavelength.

Various techniques have been used for flattening the gain spectrum. An optical notch filter having a Lorentzian spectrum can be placed at the output of the erbium doped gain fiber to attenuate the narrow peak. A smooth gain spectrum can be obtained, but with no increase in gain at longer wavelengths.

Another filter arrangement is disclosed in the publication, M. Tachibana et al. "Gain-Shaped Erbium-Doped Fibre Amplifier (EDFA) with Broad Spectral Bandwidth", Topical Meeting on Amplifiers and Their Applications, Optical Society of America, 1990 Technical Digest Series, Vol. 13, Aug. 6-8, 1990, pp. 44-47. An optical notch filter is incorporated in the middle of the amplifier by sandwiching a short length of amplifier fiber between a mechanical grating and a flat plate. This induces a resonant coupling at a particular wavelength between core mode and cladding leaky modes which are subsequently lost. Both the center wavelength and the strength of the filter can be tuned. The overall gain spectrum and saturation characteristics are modified to be nearly uniform over the entire 1530-1560 nm band. By incorporating the optical filter in the middle of the erbium doped fiber amplifier, the amplifier efficiency is improved for longer signal wavelengths.

SUMMARY OF THE INVENTION

An object of the present invention is to further improve the efficiency of a fiber amplifier and/or tailor the spectral output of a fiber amplifier. Another object is to provide an improved fiber optic filter.

Briefly, the present invention relates to a fiber optic filter structure comprising an optical fiber having a single-mode core surrounded by cladding material, and at least one light-attenuating light path in the cladding material uniformly spaced from the single-mode core. The propagation constants of the single-mode core and the light path are different at wavelengths except for at least one wavelength $\lambda_f$. The spacing between the single-mode core and the light path are sufficiently small that light within a first band of wavelengths centered around $\lambda_f$ couples between the single-mode core and the light path. At least a portion of the light within the first band of wavelengths is absorbed in the light path. The light path can be either single-mode or multimode at wavelength $\lambda_f$.

In one filter structure in accordance with the invention, the single-mode core includes at least first and second sections connected end-to-end. The light path consists of a first light path section that extends along only the first single-mode core section and a second light path section that extends along only the second single-mode core section. The propagation characteristics of the first and second light path sections are such that a different band of wavelengths couples between the single-mode core and the first and second light path sections.

The light-attenuating light path can assume various configurations. It can consist of a light-attenuating core that is laterally spaced from the single-mode core or a plurality of light-attenuating cores that are laterally spaced from the single-mode core, the propagation characteristics of each of the light-attenuating cores being different. In another modification, the light path is an annular ring that is concentric with the single-mode core.

In one of the preferred embodiments, the single-mode core is a gain core, whereby the filter structure is a fiber amplifier. The gain core is preferably located at the longitudinal axis of the optical fiber so that other fibers can be easily spliced thereto.

A fiber amplifier produces gain over a given band of wavelengths that extends from a given short wavelength to a given long wavelength. The light path can comprise a first light-attenuating core having propagation characteristics such that a band of wavelengths including the given short wavelength couples thereto. In a specific embodiment wherein the dopant ions are erbium ions, the given short wavelength is preferably within the range of 1530 nm to 1540 nm. The gain spectrum of a fiber amplifier can be made narrower by employing first and second light-attenuating cores, the first having propagation characteristics such that a band of wavelengths including the given short wavelength couples thereto, and the second having propagation characteristics such that a band of wavelengths including the given long wavelength couples thereto.

In a preferred embodiment the light path extends along the entire length of the gain core. In another embodiment wherein the gain core comprises a central section and two end sections, the light-attenuating path extends along only the central section of gain core.

In a further modification, the single-mode core includes a central section and two end sections, the end sections containing active dopant ions that are capable of producing stimulated emission of light. The light path extends along only the central section.

DESCRIPTION OF THE PREFERRED EMBODIMENTS

The drawings are not intended to indicate scale or relative proportions of the elements shown therein.

Figure 1:
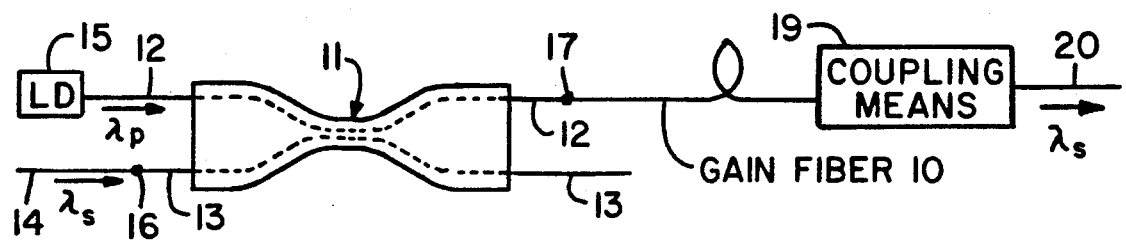
FIG. 1 is a schematic illustration of a typical fiber amplifier.

Fiber amplifiers, in which useful gain is afforded by the stimulated emission of radiation, typically include a gain fiber 10 (see FIG. 1), the core of which includes active dopant ions. A wavelength dependent multiplexer (WDM) fiber optic coupler 11 can be used for coupling pump energy of wavelength $\lambda_p$ from laser diode 15 and the signal of wavelength $\lambda_s$ from input telecommunication fiber 14 to gain fiber 10. Such devices are disclosed in U.S. Pat. Nos. 4,938,556, 4,941,726, 4,955,025 and 4,959,837, for example. The fiber pigtails extending from coupler 11 are preferably connected to other optical fibers by fusion splices. Splice 16 connects input fiber 14 to coupler fiber 13, and splice 17 connects gain fiber 10 to coupler fiber 12. A coupling means 19 such as a tapering fiber or a coupler similar to coupler 11 can provide a relatively low loss connection to outgoing telecommunication fiber 20.

The erbium-doped optical fiber amplifier has utility in communication systems, since its gain band coincides with the telecommunications window of silica fiber at a wavelength of 1550 nm. As shown by curve 23 of FIG. 2, the gain spectrum of an erbium doped fiber amplifier has a sharp peak around 1536 nm and a broad band with reduced gain to about 1560 nm. The 1536 nm peak must be reduced to prevent the occurrence of such disadvantageous operation as wavelength dependent gain or gain (with concomitant noise) at unwanted wavelengths.

Figure 3:
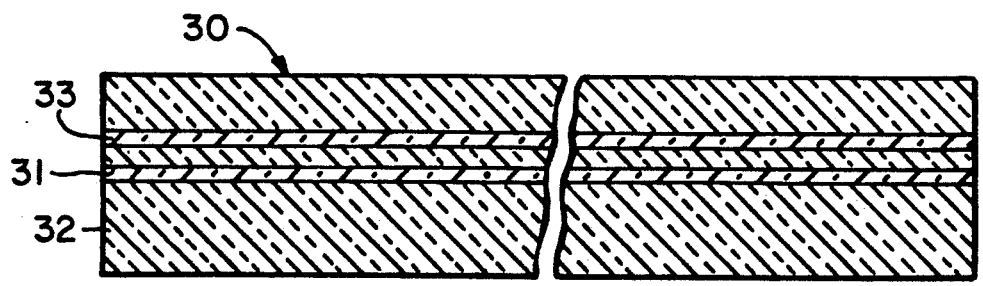
FIG. 3 is a graph showing fiber amplifier gain spectra.

A preferred embodiment of the present invention is shown in FIG. 3. Fiber amplifier 30 comprises an erbium doped amplifier core 31 of diameter D1 surrounded by cladding 32. Core 31 is preferably axially disposed within the fiber so fiber amplifier 30 can be easily fusion spliced to other fibers. A lossy core 33 of diameter D2 extends parallel to core 31 throughout the length of fiber amplifier 30. The axes of the two cores are spaced by a distance S. Core 33 may be made lossy by the addition of impurities such as $Fe^{2+}$ or other strong broad-band absorbers of the transition and rare-earth series. Core 33 could also be made lossy by forming it of phase-separable glass, i.e. one that becomes opal or glass ceramic on heat treatment. The resultant material must have scattering centers the diameters of which are on the order of the wavelength of the light to be filtered.

Each core provides an optical guidance path whereby power is propagated in a region that extends laterally to each side of the core. The spacing S between cores is made sufficiently small that their optical guidance paths overlap. Core 31 is designed for single-mode operation at the wavelengths of the optical signal to be filtered, and core 33 can be designed for either single-mode or multimode operation at those wavelengths. The attenuated wavelengths and the amount of attenuation can be controlled by adjusting the coupling characteristics of the coupler structure. The coupling characteristics may be varied by adjusting the core diameters D1 and D2, the core separation S, the deltas of the two cores and the attenuation of the lossy core. The delta of each core is determined by the cladding refractive index and the refractive index profile of that core. A discussion of coupling between cores can be found in the publication, O. Parriaux et al, "Wavelength Selective Distributed Coupling Between Single Mode Optical Fibers for Multiplixing", Journal of Optical Communications 2 (1981) 3, pp. 105-109. The characteristics of each core are selected, in a manner which in itself is well known, such that the two cores have different propagation constants except at the center of the band of wavelengths that is to be coupled and attenuated.

Figure 4:
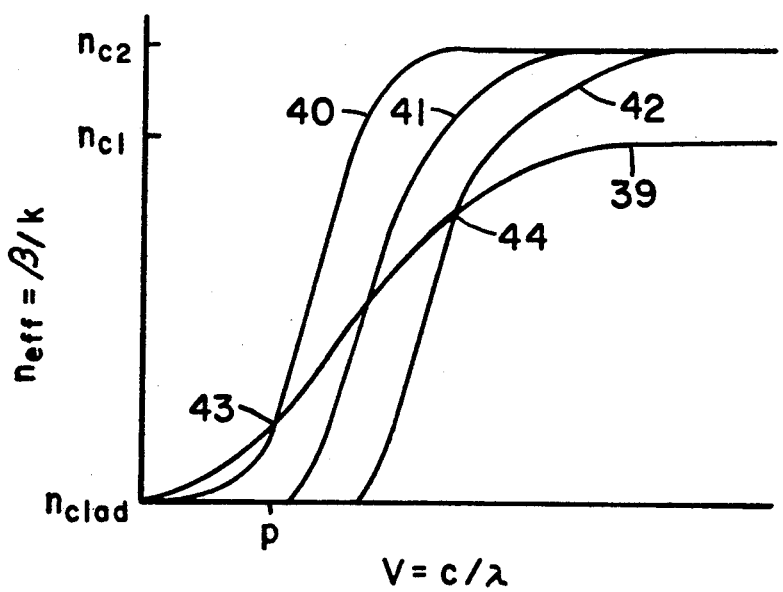
FIG. 4 is a graph illustrating the waveguide dispersion curves of the cores of FIG. 3.

In FIG. 4, effective refractive index is plotted as a function of $c/\lambda$ (c is a constant) for cores 31 and 33. In of core 31 and $n_{c2}$ is the maximum effective refractive index of core 33. In that embodiment wherein core 33 is single-mode, its effective refractive index curve 40 intersects curve 39 of core 31 at point 43. The wavelength corresponding to point 43 is the center of the band of wavelengths for which power couples between the two cores.

Curves 41 and 42 of FIG. 4 represent two of the higher order modes of core 33, in that embodiment wherein core 33 is multimode at the coupling wavelength. For certain reasons, it may be desirable to operate at the mode represented by curve 42. Curves 39 and 42 intersect at point 44 which corresponds to the center of the band of wavelengths for which power couples between the two cores when core 33 has particular multimode characteristics. The differences between the slopes of the curves intersecting at point 43 are less than the differences between the slopes of the curves intersecting at point 44. The depicted multimode operation of core 33 would therefore couple a narrower band of wavelengths than the depicted single-mode operation of that core.

Figure 2:
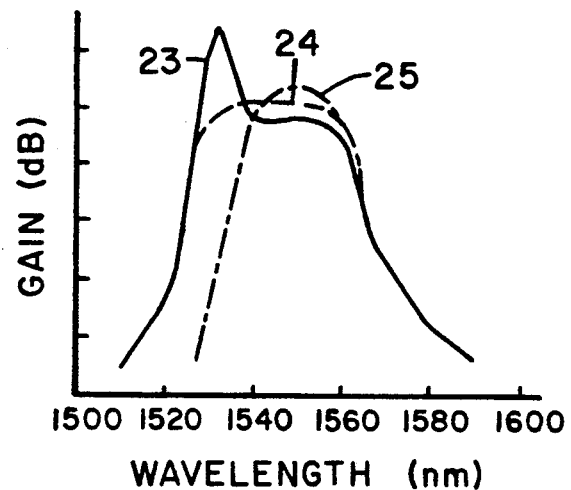
FIG. 2 is cross-sectional view of a gain fiber having a distribution filter therein.

Considering the embodiment wherein cores 31 and 33 are both single-mode, point 43, at which the propagation constants of those cores are equal, can be made to occur at a point p on the x-axis that corresponds to a wavelength $\lambda_f$ that is to be filtered or attenuated. Maximum coupling is made to occur at 1536 nm if the gain peak of curve 23 of FIG. 2 is to be suppressed. It is known that if light in a band of wavelengths centered at 1536 nm propagates in core 31, it will, by the known process of optical coupling which occurs when the propagation constants of the cores are equal, progressively transfer from core 31 to core 33, and then back again, repeatedly. The amount of power that transfers back to core 31, if any, depends upon the absorption characteristics of core 33. The width of the coupled pass-band is dependent on the relative angle of divergence between the curves 40 and 41 of FIG. 4 which can be controlled by adjusting the characteristics of the cores as described above.

Figure 5:
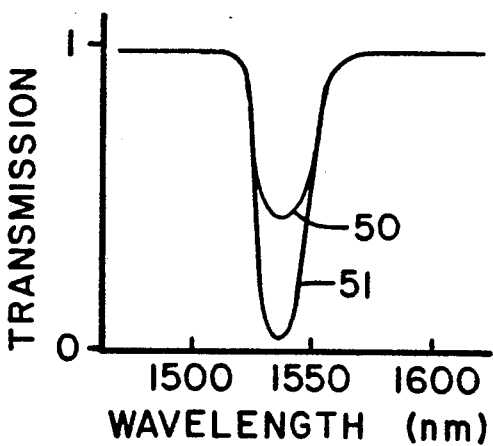
FIG. 5 is a graph illustrating two different spectral transmission characteristics for core 31 assuming the absence of lasing dopant in that core.

Fiber characteristics such as the core separation distance S and the absorption coefficient of core 33 are selected to provide the desired type of filtering. FIG. 5 shows two of the many possible spectral transmission characteristics of core 31 when combined with coupling core 33. This figure represents the transmission of core 31 in the absence of lasing dopant in that core. Depressions 50 and 51 in the transmission curve are caused by the attenuation of differing amounts of power in core 33. Consider first that case wherein coupling of power to core 33 provides some intermediate level of attenuation, as represented by curve 50. By incorporating a distributed optical filter along the entire length of fiber amplifier 30, the peak gain is efficiently suppressed and, in addition, amplifier efficiency is improved for longer signal wavelengths around 1550 nm. The improved amplifier gain around 1550 nm is due to the effect of the filter on the amplified spontaneous emission (ASE). Filtering at the peak wavelength of the gain spectrum rejects most of the spectral power of the ASE. This is because the exponential build-up of the ASE is continually suppressed along the entire length of the fiber. Consequently, a substantial proportion of the $Er^{3+}$ ions are retained in the excited state and reserved for amplification of the signal. This results in the uniform gain spectrum represented by curve 24 of FIG. 2.

If the transmission curve of fiber 31 were characterized by depression 51 of FIG. 5, substantially all of the power in that band of wavelengths centered at 1536 nm would be attenuated. The resultant filtering would essentially eliminate the shorter wavelengths from the erbium spectral gain curve, thereby resulting in a spectral gain of the type represented by curve 25.

Figure 6:
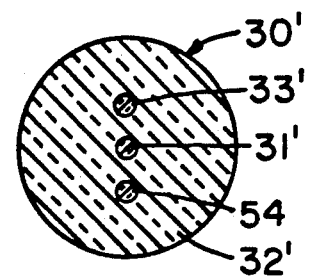
FIG. 6 is a cross-sectional view of an optical fiber having a plurality of absorbing cores spaced from the central core.

As shown in FIG. 6, wherein elements similar to those of FIG. 3 are represented by primed reference numerals, more than one lossy core can be located around the central core 31' so that several wavelengths can be filtered from the central core in a single device. Core 33' could be designed such that wavelengths centered around 1536 nm were coupled to it. Core 54 could be designed such that longer wavelengths centered around 1560 nm were coupled to it. If the absorption characteristics of cores 33' and 54 were such that all light coupled thereto is absorbed, the resultant device would exhibit a narrow gain band centered around 1545 nm.

Figure 7:
FIG. 7 schematically illustrates a fiber amplifier having a discrete, centrally located filtering fiber.

In the embodiment shown in FIG. 7, a filtering fiber 58 is fused to two lengths of gain fiber 59 and 60. Axially disposed core 61 of fiber 58 can be formed of conventional, non-amplifying glass, or it can contain the same amplifying dopant as fibers 59 and 60. Core 62 is designed as described above so that power at a given band of wavelengths is coupled to core 62 from core 61 and is attenuated. In this embodiment the amount of attenuation is determined by the length of fiber 58 in addition to the parameters mentioned in conjunction with FIG. 3. If pump power and signal power are coupled to gain fiber 59, the exponential build-up of the ASE is suppressed at filtering fiber 58, and thus the power of the ASE is reduced throughout fiber 60.

Fiber optic filter 58 could contain more than one filtering core as shown in FIG. 6.

Alternatively, a plurality of discrete wavelengths could be filtered from a central core by fusing in series a plurality of fiber optic filters, each of which is capable of filtering one of the wavelengths. In the arrangement illustrated in FIG. 8, fiber optic filters 66 and 67 are located between two sections 68 and 69 of optical fiber. The characteristics of absorbing cores 70 and 71 are such that different wavelengths couple to cores 70 and 71 of filters 66 and 67.

Fibers 68 and 69 could be gain fibers, and filters 66 and 67 could be used in the manner described above to tailor the gain spectrum.

Figure 8:
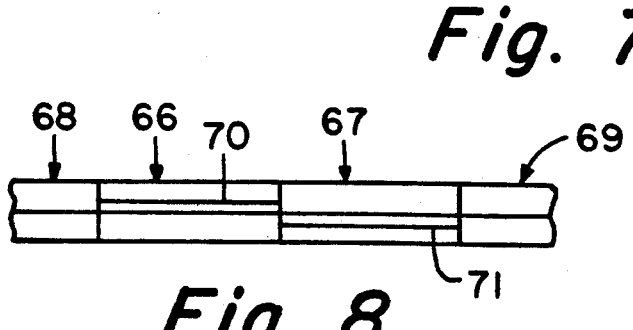
FIG. 8 schematically illustrates the serial connection of a plurality of fiber optic filters.

The arrangement of FIG. 8 could also be employed as a wavelength demultiplexer. If N wavelengths propagate in fiber 68, N-1 fiber optic filters could be connected in series between fibers 68 and 69 to remove all but one of the wavelengths.

Figure 9:
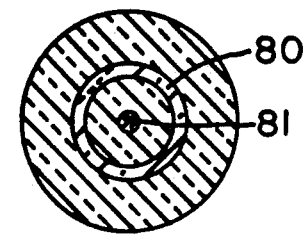
FIG. 9 is a cross-sectional view of a fiber optic filter having an annular absorbing light path.

In the fiber optic filter shown in FIG. 9, the absorbing "core" or light path is a lossy annular region 80 that is spaced from axially disposed core 81. The attenuated wavelengths and the amount of attenuation are determined by criteria similar to that employed in the parallel core embodiment, namely light path propagation characteristics, the spacing between light paths, and the absorption characteristics of path 80.

The parallel core embodiments of FIGS. 3 and 6 can be made by the rod-in-tube technique disclosed in U.S. Pat. No. 4,478,489 or the method which is taught in U.S. patent application Ser. No. 07/612,103 filed Nov. 9, 1990.

The embodiment shown in FIG. 9 can be formed by standard flame oxidation techniques. For example, concentric layers of glass particles can be deposited on a mandrel. After removing the mandrel, the resultant porous preform is consolidated and drawn into a fiber.

WE CLAIM:

1. A fiber optic filter structure comprising an optical fiber having a single-mode core surrounded by cladding material, and at least one light-attenuating light path in said cladding material uniformly spaced from said single-mode core, the propagation constants of said single-mode core and said light-attenuating light path being different at wavelengths except for at least one wavelength $\lambda_f$, the spacing between said single-mode core and said at least one light-attenuating light path being sufficiently small that light within a first band of wavelengths centered around $\lambda_f$ couples between said single-mode core and said light-attenuating light path, at least a portion of the light within said first band of wavelengths being absorbed in said light-attenuating light path.

2. A filter structure in accordance with claim 1 wherein said single-mode core is a gain core containing active dopant ions that are capable of producing stimulated emission of light.

3. A filter structure in accordance with claim 2 wherein said at least one light-attenuating light path is single-mode at wavelength $\lambda_f$.

4. A filter structure in accordance with claim 2 wherein said at least one light-attenuating light path is multimode at wavelength $\lambda_f$, and wherein the propagation constant of said single-mode core and the propagation constant of one of the higher order modes of said light-attenuating light path are different at wavelengths except for said at least one wavelength $\lambda_f$.

5. A filter structure in accordance with claim 2 wherein said gain core is located at the longitudinal axis of said optical fiber.

6. A filter structure in accordance with claim 5 wherein said at least one light-attenuating light path comprises a light-attenuating core that is laterally spaced from said gain core.

7. A filter structure in accordance with claim 5 wherein said at least one light-attenuating light path comprises a plurality of light-attenuating cores that are laterally spaced from said gain core, the propagation characteristics of each of said light-attenuating cores being such that a different band of wavelengths couples between said gain core and each of said light-attenuating cores.

8. A filter structure in accordance with claim 2 wherein said at least one light-attenuating light path comprises an annular ring that is concentric with said gain core.

9. A filter structure in accordance with claim 2 wherein the light absorbing properties of said at least one light-attenuating light path is such that essentially none of the light that couples to said light-attenuating light path couples back to said gain core.

10. A filter structure in accordance with claim 2 wherein the light absorbing properties of said at least one light-attenuating light path is such that some of the light that couples to said light-attenuating light path couples back to said gain core.

11. A filter structure in accordance with claim 2 wherein said dopant ions are capable of producing gain over a given band of wavelengths that extends from a given first wavelength to a given second wavelength, and wherein said light-attenuating light path comprises a first light-attenuating core having propagation characteristics such that a band of wavelengths including said given first wavelength couples thereto.

12. A filter structure in accordance with claim 11 wherein said dopant ions are erbium ions, and wherein said given short wavelength is within the range of 1530 nm to 1540 nm.

13. A filter structure in accordance with claim 2 wherein said dopant ions are capable of producing gain over a given band of wavelengths that extends from a given first wavelength to a given second wavelength, and wherein said light-attenuating light path comprises first and second light-attenuating cores, said first light-attenuating core having propagation characteristics such that a band of wavelengths including said given first wavelength couples thereto, said second light absorbing core having propagation characteristics such that a band of wavelengths including said given second wavelength couples thereto.

14. A filter structure in accordance with claim 2 wherein said at least one light-attenuating light path extends along the entire length of said gain core.

15. A filter structure in accordance with claim 2 wherein said gain core comprises a central section and two end sections, said at least one light-attenuating path extending along only said central section.

16. A filter structure in accordance with claim 1 wherein said single-mode core comprises a central section and two end sections, said end sections containing active dopant ions that are capable of producing stimulated emission of light, said at least one light-attenuating light path extending along only said central section.

17. A filter structure in accordance with claim 1 wherein said single-mode core comprises at least first and second sections connected end-to-end, said at least one light-attenuating light path comprising a first light-attenuating light path that extends along only said first single-mode core section and a second light-attenuating light path that extends along only said second single-mode core section, the propagation characteristics of said first and second light-attenuating light paths being such that a different band of wavelengths couples between said single-mode core and said first and second light-attenuating light-attenuating light paths.

18. A filter structure in accordance with claim 1 wherein said at least one light-attenuating light path is single-mode at wavelength $\lambda_f$.

19. A filter structure in accordance with claim 1 wherein said at least one light-attenuating light path is multimode at wavelength $\lambda_f$, and wherein the propagation constant of said single-mode core and the propagation constant of one of the higher order modes of said light-attenuating light path are different at wavelengths except for said at least one wavelength $\lambda_f$.

20. A filter structure in accordance with claim 1 wherein said single-mode core is located at the longitudinal axis of said optical fiber.

21. A filter structure in accordance with claim 20 wherein said at least one light-attenuating light path comprises a light-attenuating core that is laterally spaced from said single-mode core.

22. A filter structure in accordance with claim 20 wherein said at least one light-attenuating light path comprises a plurality of light-attenuating cores that are laterally spaced from said single-mode core, the propagation characteristics of each of said light-attenuating cores being such that a different band of wavelengths couples between said single-mode core and each of said light-attenuating cores.

23. A filter structure in accordance with claim 1 wherein said at least one light-attenuating light path comprises an annular ring that is concentric with said single-mode core.

24. A filter structure in accordance with claim 1 wherein the light absorbing properties of said at least one light-attenuating light path is such that essentially none of the light that couples to said light-attenuating light path couples back to said single-mode core.

25. A filter structure in accordance with claim 1 wherein the light absorbing properties of said at least one light-attenuating light path is such that some of the light that couples to said light-attenuating light path couples back to said single-mode core.

26. A fiber optic amplifier structure comprising an optical fiber having a single-mode gain core doped with active dopant ions capable of producing stimulated emission of light within a predetermined range of wavelengths, said optical fiber further comprising light-attenuating coupling means, the coupling characteristics of said gain core and said coupling means being such that optical power in at least one wavelength band centered around at least one wavelength $\lambda_f$ within said predetermined range of wavelengths is selectively coupled and attenuated, while optical power at other wavelengths within said predetermined range of wavelengths remains substantially guided by said gain core.

27. The fiber optic amplifier structure of claim 26 wherein said coupling means comprises an attenuating core uniformly spaced from said gain core, and wherein the propagation constants of said attenuating core and said gain core are different except at said at least one wavelength $\lambda_f$.

28. The fiber optic amplifier structure of claim 27 wherein said attenuating core comprises light-absorbing means.

29. The fiber optic amplifier structure of claim 28 wherein said attenuating core comprises a waveguide which is multimode at said at least one wavelength $\lambda_f$.

30. A fiber optic structure for amplifying optical signals, comprising an optical fiber having a single-mode gain core and a light-attenuating core uniformly spaced within a common cladding, said gain core containing active dopant ions that are capable of producing stimulated emission of light within a predetermined band of wavelengths, the optical characteristics of said cores being such that the propagation constants of said cores are different except for at least one wavelength $\lambda_f$ within said predetermined band of wavelengths, the spacing between said cores being sufficiently small that light within a band of wavelengths centered around $\lambda_f$ couples between said gain core and said light-attenuating core.

* * * * *

UNITED STATES PATENT AND TRADEMARK OFFICE
CERTIFICATE OF CORRECTION

PATENT NO.   :   5,067,789
DATED        :   November 26, 1991
INVENTOR(S)  :   Douglas W. Hall and Robert M. Hawk It is certified that error appears in the above-identified patent and that said Letters Patent is hereby corrected as shown below:

Column 4, between lines 24 and 25, insert:
"this figure $n_{c1}$ is the maximum effective refractive index"

Signed and Sealed this

Twentieth Day of April, 1993

Attest:

MICHAEL K. KIRK

Attesting Officer        Acting Commissioner of Patents and Trademarks

Adverse Decision In Interference

Patent No. 5,067,789, Douglas W. Hall, Robert M. Hawk, FIBER OPTIC COUPLING FILTER AND AMPLIFIER, Interference No. 104,075, final judgment adverse to the patentees rendered March 28, 2001, as to claims 1-7, 9-22 and 24-30.

*(Official Gazette May 15, 2001)*